United States Patent [19]

Orkin

[11] Patent Number: 4,719,798
[45] Date of Patent: Jan. 19, 1988

[54] WIND DIRECTION FINDER FOR A GOLF CART

[76] Inventor: Henry E. Orkin, 1138 W. Cypress Dr., Pompano Beach, Fla. 33060

[21] Appl. No.: 886,879

[22] Filed: Jul. 18, 1986

[51] Int. Cl.$^4$ .......................... G01W 1/02; A63B 57/00
[52] U.S. Cl. ..................................... 73/189; 273/32 H
[58] Field of Search .............. 73/188, 189; 116/28 R, 116/173, 265, 275, DIG. 7, DIG. 14, DIG. 43, 35 R, 35 A, 234, 238, 239, 278; 273/32 H; 280/DIG. 5, DIG. 6; 24/DIG. 11; 40/594, 630

[56] References Cited

U.S. PATENT DOCUMENTS

| | | | |
|---|---|---|---|
| 1,322,796 | 11/1919 | Kissel | 116/238 |
| 3,799,106 | 3/1974 | Lamport | 116/28 R |
| 4,223,631 | 9/1980 | Poad | 116/265 |
| 4,567,760 | 2/1986 | Crowder | 73/188 |

Primary Examiner—Charles A. Ruehl
Attorney, Agent, or Firm—Harry W. Barron

[57] ABSTRACT

A wind direction finder for use on a golf course includes a fastener portion and a ribbon portion which is attached to the fastener portion. The fastener portion includes an adhesive material having a peel away sheet, which when removed, allows the wind direction finder to be attached to the canopy frame post of a golf cart, preferably on the portion at an angle away from a line perpendicular to the ground. As the wind freely blows between the main body of the golf cart and the canopy, the wind lifts the free end of the ribbon, and the angle and direction of the ribbon can be observed by the golfer to indicate both the direction and speed of the wind. With this knowledge, the golfer can make appropriate compensations in the golf shot to be made. The fastener portion includes an interior member having the adhesive on one side thereof and a backing member and the ribbon is affixed between the interior member and the backing member. Identifying or advertising information may be printed on the side of the backing remote from the attached ribbon.

12 Claims, 4 Drawing Figures

WIND DIRECTION FINDER FOR A GOLF CART

This invention relates to a wind direction finder and more particularly to such a wind direction finder for use by a golfer while playing on a golf course.

As every golfer is well aware, one of the many factors which can influence a good or bad golf shot is the wind. Even a novice golfer knows to compensate the direction of a golf shot based on the speed and direction of the wind over the area of the flight of the ball.

Most golf courses have a flag attached to the pin in the hole in which the golfer is attempting to place the ball. This flag will flutter with the breeze so that by looking at the flag the golfer can determine the wind direction. However, in many instances the flat may be five hundred or more yards away from the golfer or the flag may be so small it can not be seen or it may be blocked from view by hills or trees or the wind may be in the golfer's face causing him to be unable to judge the pin flag. In these instances the golfer is unaware of the exact direction and strength of the wind. In other circumstances, the wind at the golf course green may be different from the wind in the middle of the fairway, so using the pin flag will be misleading. Of course, the golfer can get a general idea of wind speed and direction by the breeze in his face, but this can be quite deceiving particularly when a golfer is moving.

It would be preferable to have some wind direction gauge in the vicinity of the golfer. Such a device should be readably observable by the golfer at the time he is preparing to take his shot. Further, it should judge both the wind direction and give some indication of the wind speed in order to allow the golfer to properly compensate the direction and/or length of his shot. Such a device should be inexpensive and readily replaceable by the golfer. It could, in fact, be a handout device given to each golfer with advertising thereon, whereby the advertiser would pay for the cost.

Since many golfers utilize golf carts, an ideal place for the wind director would be on the golf cart itself. This is particularly true of the electric golf carts which typically have a canopy held above the area in which the golfer and others sit while transporting themselves from one area to another on a golf course. The canopy above the passenger area of the cart is typically held up by four square or rectangular shaped rods extending upward from the main body of the cart. The area between the main body and the canopy, except for the four poles, is generally open space and the wind blows freely through this area. Such an area provides an ideal place to position a wind direction finder. This type of positioning is particularly advantageous since the golf cart normally is in the same area as the golfer when the golfer is about to make his shot. Thus, the golfer can get a good reading of the wind in the immediate area, rather than at the tee.

Wind direction finders have been used in many other areas for many years. For example, the old fashion weather vane includes an object attached to a rotatable rod and is positioned by the wind in a particular direction parallel to the direction of the wind. Such a device, of course, could be placed on a golf car, but would be quite expensive and prone to damage due to the constant motion and starting and stopping of the golf cart.

Other types of wind direction finders have long been used in sail boat racing, where knowledge of wind speed relative to the boat movement direction is critical. For example, in U.S. Pat. No. 3,799,106 in the name of Lamport, streamers are attached to the sail of a sail boat and can be viewed by the yachtsman to determine the relative wind direction. However, such devices are not intended to and do not give the actual wind direction when the boat is standing still, since the sail acts as a shield against the wind under certain circumstances. These devices are most useful during the race to direct the vessel to run with the wind. Another type of wind director for use with a sail boat is shown in U.S. Pat. No. 4,223,631 in the name of Poad. A similar type device, useful with an airplane, is shown in U.S. Pat. No. 4,567,760 in the name of Crowder and still another device useful with boats is shown in U.S. Pat. No. 3,395,577 in the name of Keim.

Each of these devices all suffer from the same basic problem in that the vehicle to which they are attached is moving and they are incapable of giving a true indication of the wind itself. Rather they are useful for giving a relative indication of whether the device is taking advantage of optimum wind direction. Such a direction finder wound be of little use to the golfer who must know, prior to the time he hits the shot, the effect that the wind will have on the golf ball after it is hit.

In accordance with one aspect of this invention, there is provided a wind direction finder for attachment to a canopy post of a golf cart comprising a backing material of a width less than the width of the canopy post and an interior member having an adhesive surface. Further, there is provided a peel away covering on the adhesive surface and a ribbon of a width less than the width of the backing material positioned between the backing material and the interior member surface remote from the adhesive surface thereof. Additionally, there is provided adhesive material between the backing material and the remote surface of the backing material for holding the ribbon and affixing the interior member to the backing material.

One preferred embodiment of the subject invention is hereafter described with specific reference being made to the following figures, in which.

Figure 1:
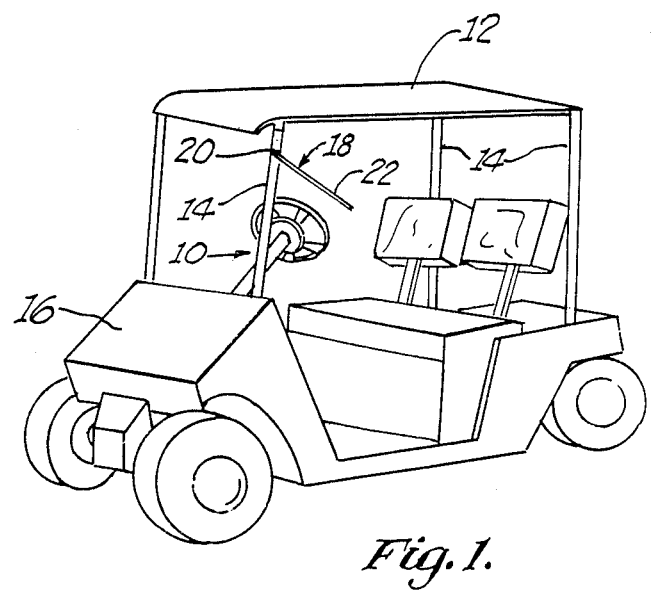
FIG. 1 shows a golf cart with the wind direction finder of the subject invention attached to a canopy post thereof.

Referring now to FIG. 1, a golf cart 10 is shown having a canopy 12 held up by four canopy frame posts 14. The frame posts 14 are coupled to a main body 16 of cart 10 and an open air area exists between body 10 and canopy 12 in which the wind will flow freely with minimum disturbance due to the presence of the four canopy frame posts 14.

A wind direction finder 18 is attached to one of the canopy frame posts 14. The wind direction finder 18 includes a fastener portion 20 and a ribbon portion 22. The fastener portion 20 is adapted for attachment to one of the sides of the square canopy frame posts 14. Fastener 20 should be sufficiently flexible so as to be attachable to a round post similar to post 14 which could be used in place of the generally square post 14. The ribbon 22 is attached within the fastener 20 and should be of a length sufficient to be blown by the wind. The length of ribbon 22 will be dependent upon its weight and flexibility. Typically, a thin strip of paper or cloth ribbon can be used for ribbon 22. In either case, the material of ribbon 22 should be extremely flexible so as to be able to be bent and raised by the wind while it is held at one end by the fastener portion 20. By making ribbon 22 sufficiently long, its weight will cause ribbon 22 to be at an angle for small amounts of wind, and hence, both wind speed and direction can be determined.

Figure 2:
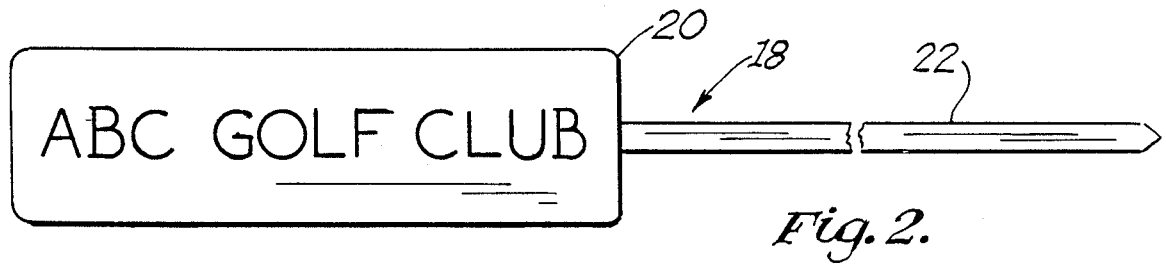
FIG. 2 shows a more expanded view of the wind direction finder of the subject invention from the front side thereof.

Referring now to FIG. 2, an enlarged view of wind direction finder 18 is shown. The fastener portion 20 should have one outer surface thereof, shown in FIG. 2 as the front, which is adaptable to have information printed thereon. One type of material which may be utilized is paper and advertisements, such as a golf club's name, sponsor's name, golf tournament name or commercial ads, which may be printed thereon. Because the wind direction finder of the subject invention is extremely inexpensive to fabricate, it is anticipated that the wind direction finders 18 cold be given away as a promotional item or provided to the golfer as a part of the normal green fees. In order to accomplish this it is desirable that the party actually paying for the wind direction finder 18 place its name, for advertising purpose, on the wind direction of finder 18.

The width of fastener 20 portion of wind direction finder 18 should be substantially the same width as one side of post 14. Typically, in golf carts, the canopy frame posts 14 are three-quarters of an inch square and, hence, the width of fastener portion 20 should be three quarters of an inch square. As used herein the width is the vertical dimension as shown in FIG. 2.

The length of fastener portion 20 can vary depending on the amount of printing desired to be placed on portion 20. Typically, the length will be between one and a half and three inches long so that it is suitable for affixing to post 14.

Figure 3:
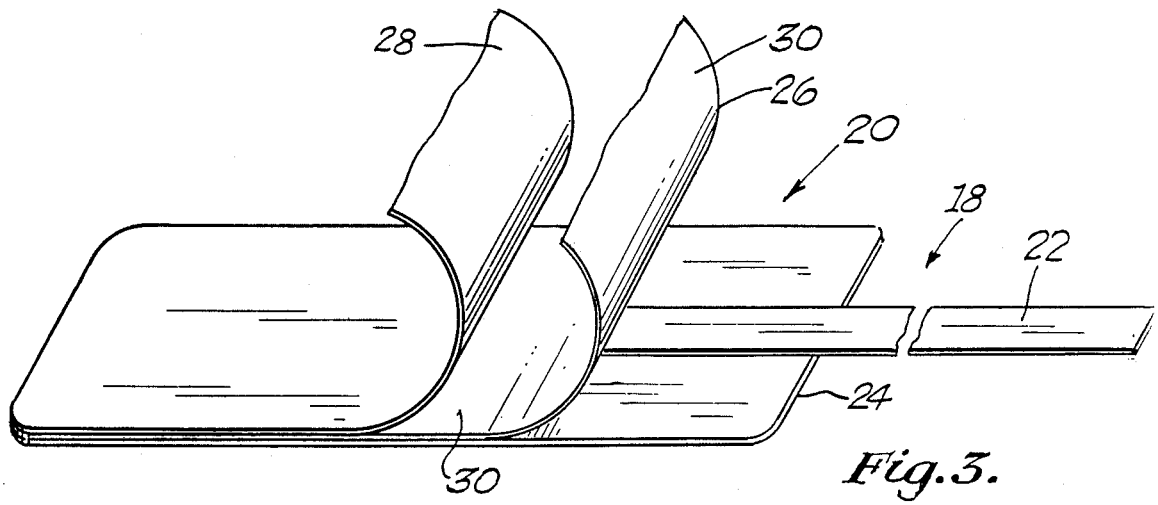
FIG. 3 shows a more expanded view of the wind direction finder of the subject invention from the back side thereof, with portions of the material peeled away.

Referring now to FIG. 3, the other side of wind direction finder 18 is shown. From FIG. 3 it is seen that the fastener portion 20 of wind direction finder 18 includes a backing sheet 24, an interior sheet 26 and a peel-away sheet 28. Ribbon 22 should be placed between the interior sheet 26 and backing sheet 24. As shown in FIG. 3, interior sheet 26 has an adhesive material 30 on both sides thereof. Thus, when interior sheet 26 is placed against backing sheet 24 it is held thereagainst by the adhesive material 30. Adhesive material 30 also holds ribbon 22 firmly in place.

Peel-away sheet 28 fits over the adhesive material 30 on the side away from ribbon 22 of interior sheet 26. Peel-away sheet 28 is removed just prior to the time that wind direction finder 18 is to be attached to post 14 of golf cart 10. This allows the adhesive material beneath peel-away sheet 28 to attach the fastener portion 20 to post 14.

Figure 4:
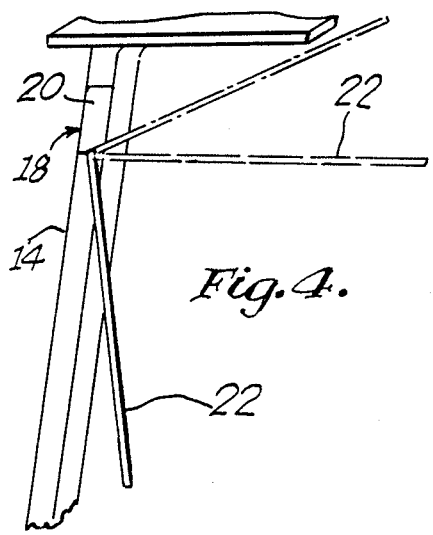
FIG. 4 shows a more detailed view of the manner in which the wind direction finder of the subject invention is attached to the golf cart canopy post.

Referring now to FIG. 4, the desired positioning of wind direction finder 18 with respect to post 14 is shown. In the typical golf cart 10, the canopy frame post 14 has a portion at an angle away from the vertical. Fastener 20 should be placed on this portion of the post 14 so that ribbon 18 hangs vertically downward and slightly away from the remainder of post 14. In this manner, the wind coming from any direction will be able to carry ribbon 18 upward as shown by the dashed line versions of ribbon 22 in FIG. 4. As the wind blows, ribbon 22 will point in the direction of the wind. Further, the amount of sag in ribbon 22 will be an indication of the strength of the wind. The length, density and flexibility of ribbon 22 should be selected for anticipated breezes on any particular day. For example, a three eighths inch wide cloth ribbon between eight and sixteen inches may be used for ribbon 22. Both the direction and the positioning of ribbon 22 can be viewed by the golfer to determine both the wind and strength and wind direction and appropriate adjustments to the golf swing can be made to compensate for the winds effect on the golf ball.

What is claimed is:

1. In combination:
   a golf cart having a canopy held up by a plurality of canopy posts attached to the body of said cart such that wind is free to blow between said canopy and said body; and
   a wind direction finder having a ribbon affixed to means adhesively affixed to one of said canopy posts.

2. The invention according to claim 1 wherein said wind direction finder is attached to said canopy post at an angle with respect to perpendicular.

3. The invention according to claim 1 wherein the width of said adhesively affixed means is not greater than the width of said canopy post.

4. The invention according to claim 3 wherein said wind direction finder is attached to said canopy post at an angle with respect to perpendicular.

5. The invention according to claim 4 wherein said ribbon is of a length, density and flexibility sufficient to indicate wind direction and speed.

6. The invention according to claim 5 wherein said ribbon is of a cloth material and is between eight and sixteen inches in length.

7. In combination:
   a golf cart having a canopy held up by a plurality of canopy posts attached to the body of said cart such that wind is free to blow between said canopy and said body; and
   a wind direction finder including a ribbon extending from support means adhesively affixed to one of said canopy posts, said support means including:
   a back sheet having an outer surface of a material of a type upon which information can be printed, and an inner surface; and
   an interior sheet having an outer surface to which an adhesive material is attached and an inner surface affixed to said inner surface of said backing sheet, said ribbon being positioned between said backing sheet inner surface and said interior sheet inner surface and affixed to at least one of said inner surfaces, said adhesive material further being attached to said canopy post.

8. The invention according to claim 7 wherein said wind direction finder is attached to said canopy post at an angle with respect to perpendicular.

9. The invention according to claim 7 wherein the width of said backing sheet and said interior sheet is not greater than the width of said canopy post.

10. The invention according to claim 9 wherein said wind direction finder is attached to said canopy post at an angle with respect to perpendicular.

11. The invention according to claim 10 wherein said ribbon is of a length, density and flexibility sufficient to indicate wind direction and speed.

12. The invention according to claim 11 wherein said ribbon is of a cloth material and is between eight and sixteen inches in length.

* * * * *